United States Patent [19]

Robertson et al.

[11] 4,039,631
[45] *Aug. 2, 1977

[54] RADIATION CROSS-LINKABLE COMPOSITIONS OF COPOLYMERS OF ETHYLENE AND A HALOGENATED MONOMER

[75] Inventors: Arthur B. Robertson, Succasunna; Robert J. Schaffhauser, Brookside, both of N.J.

[73] Assignee: Allied Chemical Corporation, Morris Township, N.J.

[*] Notice: The portion of the term of this patent subsequent to Mar. 30, 1993, has been disclaimed.

[21] Appl. No.: 602,048

[22] Filed: Aug. 5, 1975

Related U.S. Application Data

[63] Continuation-in-part of Ser. No. 327,907, Jan. 20, 1973, Pat. No. 3,947,525.

[51] Int. Cl.² .................... C08F 2/46; C08F 259/08
[52] U.S. Cl. ..................... 260/878 R; 204/159.17

[58] Field of Search ..................... 260/878 R

[56] References Cited

U.S. PATENT DOCUMENTS

| 2,820,776 | 1/1958 | Robb et al. | 526/18 |
|---|---|---|---|
| 3,745,145 | 7/1973 | Khattab et al. | 260/45.85 R |
| 3,763,222 | 10/1973 | Aronoff et al. | 526/284 |
| 3,773,698 | 11/1973 | Khattab | 260/45.75 R |
| 3,947,525 | 3/1976 | Robertson et al. | 260/878 R |

*Primary Examiner*—Alan Holler
*Attorney, Agent, or Firm*—Michael S. Jarosz; Roger H. Criss

[57] ABSTRACT

Radiation cross-linkable compositions comprising a copolymer of ethylene and a halogenated monomer selected from the group consisting of chlorotrifluoroethylene, tetrafluoroethylene and mixtures thereof and an effective amount of a radiation cross-linking agent selected from the group consisting of diallyl isophthalate, diallyl terephthalate and mixtures thereof.

13 Claims, No Drawings

RADIATION CROSS-LINKABLE COMPOSITIONS OF COPOLYMERS OF ETHYLENE AND A HALOGENATED MONOMER

CROSS-REFERENCE TO OTHER APPLICATIONS

This application is a continuation-in-part of our copending U.S. application Ser. No. 327,907 filed Jan. 20, 1873, now U.S. Pat. No. 3,947,525.

BACKGROUND OF INVENTION

1. Field of Invention

This invention relates to radiation cross-linkable ethylene-chlorotrifluoroethylene and ethylene-tetrafluoroethylene copolymer compositions.

2. Description of the Prior Art

It has heretofore been proposed to irradiate ethylene-chlorotrifluoroethylene copolymers and ethylene-tetrafluoroethylene copolymers to improve tensile strength as well as other properties at elevated temperatures. The proposed ionizing radiation includes X-rays, gamma rays, electron beams and the like. It has also been proposed to incorporate a small amount of a cross-linking promoter such as triallyl cyanurate into the copolymer prior to irradiation to reduce the irradiation dosage required to provide improved mechanical properties.

In our copending U.S. application Ser. No. 327,907, filed Jan. 20, 1973, there is disclosed melt-processable, radiation cross-linkable ethylene-chlorotrifluoroethylene copolymer compositions which contain, in weight percentages based upon the weight of the copolymer, about 0.1 to 5% of a radiation crosslinking promoter, about 0.1 to 5% of an anti-oxidant, and about 0.1 to 30% of an acid scavenger. Such compositions give off minimum odor when irradiated to cross-link the copolymer and do not develop bubbles subsequent to irradiation. Among the cross-linking promoters described therein are diallyl terephthalate and diallyl isophthalate.

SUMMARY OF THE INVENTION

In accordance with this invention, radiation cross-linkable compositions are provided which comprise a copolymer of ethylene and a halogenated comonomer selected from the group consisting of chlorotrifluoroethylene, tetrafluoroethylene and mixture thereof and an effective amount of a radiation cross-linking agent selected from group consisting of diallyl terephthalate, diallyl isophthalate and mixtures thereof. Preferably, the cross-linking agent is present in an amount of about 0.1 to 5% by weight of the copolymer. It has been found that for certain uses, the presence of the anti-oxidants and acid scavengers described in said copending application are not required and in fact in most cases the elongation properties at elevated temperatures are actually increased when such additives are not present.

DESCRIPTION OF THE PREFERRED EMBODIMENT

In accordance with a preferred embodiment of this invention, radiation cross-linkable compositions are provided which are based upon a copolymer of ethylene and a halogenated comonomer selected from the group consisting of chlorotrifluoroethylene, tetrafluoroethylene and mixtures thereof. Preferably, the copolymers comprise of about 40 to 60 mol percent ethylene and correspondingly about 60 to 40 mol percent of the halogenated comonomer. Most preferably, approximately equimolar copolymers of ethylene and the halogenated comoner are preferred.

These copolymers are well known to those skilled in the are and may be prepared by a variety of processes. Their preparation is described, for example, in U.S. Pat. No. 3,847,881 issued to Mueller et al. in 1974 and U.S. Pat. No. 3,624,250 issued to Carlson in 1971. Preferably, copolymers containing chlorotrifluoroethylene alone or also containing tetrafluoroethylene as the halogenated comonomer are prepared by batchwise bulk copolymerization of the monomers at temperatures between about $-20°$ and $+20°$ C. at superatmospheric pressure in an agitated pressure vessel, preferably in the presence of inert fluorocarbon solvent, by charging the vessel with the liquid monomer and admitting gaseous ethylene into the vessel, using copolymerization initiators effective at such temperatures such as organic peroxides (e.g., trifluoroacetyl peroxide). For copolymers of ethylene and tetrafluoroethylene, similar conditions can be employed except that the temperature preferably ranges from about 30° to 85° C. The copolymers of the present invention may also be prepared by copolymerization in aqueous suspension or dispersion using known techniques.

The copolymers may additionally contain up to about 10 mol percent, based upon the mols of the halogenated comonomer, of other copolymerizable monomers. Such other comonomers include 3,3,3-trifluoro-2-trifluoromethyl propene, as described in the aforesaid patent to Mueller et al., and vinyl monomers as suggested in the aforesaid patent to Carlson. Accordingly, it is to be understood that the terms ethylene-chlorotrifluoroethylene copolymer and ethylene-tetrafluoroethylene copolymer include copolymers which may contain up to about 10% of other copolymerizable monomers.

The copolymer compositions of this invention include as cross-linking agent diallyl isophthalate, diallyl terephthalate, or mixtures thereof. The most preferred cross-linking promoter is diallyl isophthalate. These cross-linking promoters serve to reduce the radiation dosage required to effect the cross-linking of the copolymer and enhances the physical properties thereof. The cross-linking promoter is preferably present in amount of about 0.1 to 5% by weight based upon the weight of the copolymer, more preferably about 0.75 to about 2.5%.

The radiation utilized to cross-link the copolymer is of sufficiently high energy to penetrate the thickness of the copolymer being treated and produce ionization therein. The ionization radiation may consist of X-rays, gamma rays, or a beam of electrons, deuterons, alpha-particles, beta-particles or the like, or combinations thereof. As such types of radiation and their sources are well known, they are not specifically described herein. Preferred ionizing radiation sources include cobalt-60, which emits highly penetrating gamma radiation, and high energy electron beams.

The amount of radiation to which the copolymer composition is subjected to improve its mechanical and other properties is generally in the range of about 2 to 15 megarads or higher, preferably in the range of about 5 to 15 megarads.

As pointed out above, it has been found that for certain purposes the anti-oxidants and acid scavengers described in our copending application need not be employed in the copolymer compositions. Indeed, the copolymer composition of this invention may consist essentialy of the copolymers and diallyl isophthalate or diallyl terephthalate or mixtures thereof as cross-linking agent. For example, anti-oxidants and acid scavengers need not be employed when the composition is utilized as a powder coating composition or in applications in which the electrical properties of the composition are not critical.

However, for certain applications the anti-oxidants and the acid scavengers described in said copending application may be utilized separately in the compositions of this invention. Thus, the present compositions may include an anti-oxidant or an acid scavenger.

Anti-oxidants which may be employed in this invention may be a mixture of a phosphite or an organic polyhydric phenol and a salt of a carboxylic acid and a metal of Group II or the Periodic Table; an alkylated phenol or bisphenol having 1 to 18 carbon atoms in the alkyl chain such as butylated hydroxytoluene, 4,6-di-t-butylmeyacresol and the like, and an alkylidene bis, tris, or other polyphenol having 1 to 8 carbon atoms in the alkylidene chain such as tetrakis-[methylene-3-(3', 5'-di-tert-butyl-4'-hydroxyphenyl) propionate] methane, 2,2-methylene-bis(4-ethyl-6-tert-butylphenol) and the like. Preferably, the anti-oxidant is admixed with an ester or alkali metal salt of thiodipropionic acid. Preferred anti-oxidants include about 0.01 to 5% by weight of the copolymer of a transesterified reaction product of an organic polyhydric phenol having from 6 to about 50 carbon atoms and an organic phosphite triester free from phenolic hydroxy groups having up to about 60 carbon atoms obtained by transesterification of the phenol and phosphite; about 0.01 to 5% by weight of the copolymer of a salt of a monocarboxylic acid having from about 6 to 24 carbon atoms and a metal of Group II of the Periodic Table; and about 0.01 to 5% by weight of the copolymer of an ester or alkali metal salt of thiodipropionic acid. Specific examples of such anti-oxidants include mixtures of the phosphite of 4,4-n-butylidene-bis(6-tertbutyl-m-cresol) or tetrakis[methylene-3-(3', 5'-di-t-butyl-4'-hydroxyphenyl) propionate] methane, plus zinc-2-ethylhexalate and distearylthiodipropionate.

Alternate to the use of the anti-oxidants, there may be employed herein acid scavengers which are oxides of a metal of Group II of the Periodic Table. Examples of such oxides include calcium oxide, strontium oxide, barium oxide, magnesium oxide, zinc oxide, and cadmium oxide; the preferred acid scavenger is calcium oxide.

The anti-oxidants are employed herein to increase the processability of the copolymer compositions whereas the acid scavengers are utilized to minimize odor emission and bubbles formation when the copolymer compositions are subjected to irradiation.

The additives employed in this invention may be admixed with the copolymers using conventional mechanical procedures. Alternatively, the additives may be admixed with the comonomers during copolymerization. If more than one additive is employed, they can be added separately or be mixed prior to addition and they may be added in solution or be dry-blended with the copolymer.

The following non-limiting examples depict the best mode of the present invention.

EXAMPLE 1

Dry powdered ethylene-chlorotrifluoroethylene copolymer containing about 50 mol percent of ethylene units and having a melting point of 245° C. was blended with various additives in a ball mill for one hour. The blends were subjected to various amounts of cobalt-60 radiation at a dose rate of 2.5 megarads per hour to cross-link the copolymer. The melt index of the various samples was determined. The melt index as used herein refers to the amount in grams of the copolymer that can be forced through a 0.825 inch orifice subjected to a 2160 gram force in ten minutes at 275° C. (ASTM D-1238).

The samples were subjected to tensile and elongation tests at a temperature of 200° C. The results of such tests and the melt index are reported in Table I below.

TABLE I

| Sample | Additives | Cobalt-60 Dosage, Megarads | Melt Index | Tensile Strength at 200° C, psi | Elongation at 200° C, % |
|---|---|---|---|---|---|
| 1 | A | 0 | 2.5 | — | — |
| 2 | A | 10 | 1.0 | — | — |
| 3 | 1% DAIP | 10 | 0 | 246 | 304 |
| 4 | 1% DAIP | 15 | 0 | 552 | 563 |
| 5 | 2% DAIP | 10 | 0 | 421 | 435 |
| 6 | 2% DAIP | 15 | 0 | 432 | 405 |
| 7 | 1% DAIP Plus A | 10 | 0 | — | 470 |
| 8 | 1% DAIP Plus A | 15 | 0 | — | 400 |
| 9 | 2% DAIP Plus A | 10 | 0 | — | 405 |
| 10 | 2% DAIP Plus A | 15 | 0 | — | 338 |
| 11 | 1% DATP | 10 | 0 | 314 | 458 |
| 12 | 1% DATP | 15 | 0 | 583 | 564 |
| 13 | 2% DATP | 10 | 0 | 512 | 430 |
| 14 | 2% DATP | 15 | 0 | 511 | 385 |
| 15 | 1% DATP | 10 | 0 | — | 220 |

TABLE I-continued

| Sample | Additives | Cobalt-60 Dosage, Megarads | Melt Index | Tensile Strength at 200° C, psi | Elongation at 200° C, % |
| --- | --- | --- | --- | --- | --- |
| 16 | Plus A 1% DATP Plus A | 15 | 0 | — | 510 |

A = 0.225% of phosphite of 4,4-n-butylidene-bis-(6-t-butyl-m-cresol) plus 0.075% zinc-2-ethyl-hexylate plus 0.15% distearylthiodipropionate plus 0.5% CaO
DAIP = diallyl isophthalate
DATP = diallyl terephthalate As can be seen from Table I, the addition of 1% of diallyl isophthalate or diallyl terephthalate cross-links the copolymer composition when subjected to 10 megarads or above, as indicated by a melt index of 0 (that is, no material could be forced through the orifice). It can also be seen when comparing Samples 4-6, 11 and 12 with Samples 8-10, 15 and 16, respectively, that the elongation of the former samples which did not contain the anti-oxidant and acid scavenger system was superior to that of the latter samples which did contain such system.

It is to be understood that variations and modifications of the present invention may be made without departing from the scope of the invention. It is also to be understood that the scope of the invention is not to be interpreted as limited to the specific embodiment disclosed herein, but only in accordance with the appended claims when read in light of the foregoing disclosure.

We claim:
1. A radiation cross-linkable composition comprising an admixture of a copolymer of ethylene and a halogenated monomer selected from the group consisting of chlorotrifluoroethylene, tetrafluoroethylene and mixtures thereof and an effective amount of a radiation cross-linking agent selected from the group consisting of diallyl isophthalate, diallyl terephthalate, and mixtures thereof.
2. The composition of claim 1 wherein said cross-linking agent is present in an amount of about 0.1 to 5% based upon the weight of said copolymer.
3. The composition of claim 2 wherein said copolymer is ethylene-chlorotrifluoroethylene.
4. The composition of claim 3 wherein said copolymer is an approximately an equimolar copolymer of ethylene-chlorotrifluoroethylene.
5. The composition of claim 4 wherein said cross-linking agent is diallyl isophthlate.
6. The composition of claim 5 wherein said cross-linking agent is present in an amount of about 0.75 to 2.5%.
7. The composition of claim 4 wherein said cross-linking agent is diallyl terephthalate.
8. A composition of claim 2 wherein said copolymer is ethylene-tetrafluoroethylene.
9. The composition of claim 1 additionally including from about 0.1 to 5% based upon the weight of the copolymer of an antioxidant.
10. The composition of claim 9 wherein said anti-oxidant is selected from the group consisting of (1) mixtures of a phosphite of an organic polyhydric phenol and a salt of a carboxylic acid and a metal of Group II of the Periodic Table, (2) alkylated phenols and bisphenols having 1 to 18 carbon atoms in the alkyl chain, (3) alkylidene bis, tris and polyphenols having 1 to 8 carbon atoms in the alkylidene chain, and (4) mixtures of (1), (2), or (3) with an ester or alkali metal salt of thiodipropionic acid.
11. The composition of claim 1 additionally including from about 0.1 to 30% by weight of an acid scavenger.
12. The composition of claim 11 wherein said acid scavenger is an oxide of a metal of Group II of the Periodic Table.
13. The composition of claim 12 wherein said acid scavenger is calcium oxide.

* * * * *